(12) United States Patent
Auburger

(10) Patent No.: US 8,438,992 B2
(45) Date of Patent: May 14, 2013

(54) MILK COLLECTING PIECES WITH CLOSABLE CHAMBERS

(75) Inventor: Markus Auburger, Lippstadt (DE)

(73) Assignee: GEA Farm Technologies GmbH, Bönen (DE)

( * ) Notice: Subject to any disclaimer, the term of this patent is extended or adjusted under 35 U.S.C. 154(b) by 0 days.

(21) Appl. No.: 12/734,860

(22) PCT Filed: Dec. 18, 2008

(86) PCT No.: PCT/EP2008/067939
§ 371 (c)(1),
(2), (4) Date: Jul. 16, 2010

(87) PCT Pub. No.: WO2009/077607
PCT Pub. Date: Jun. 25, 2009

(65) Prior Publication Data
US 2011/0185974 A1    Aug. 4, 2011

(30) Foreign Application Priority Data
Dec. 19, 2007   (DE) .......................... 10 2007 061 275

(51) Int. Cl.
*A01J 5/00*    (2006.01)
(52) U.S. Cl.
USPC .................................... 119/14.55; 119/14.34
(58) Field of Classification Search ............... 119/14.01, 119/14.37, 14.05, 14.18, 14.34, 14.35, 14.46, 119/14.47, 14.51, 14.38, 14.39, 14.54, 14.55
See application file for complete search history.

(56) References Cited

U.S. PATENT DOCUMENTS

| | | | | |
|---|---|---|---|---|
| 3,482,547 A | * | 12/1969 | Maier | 119/14.36 |
| 3,696,790 A | * | 10/1972 | Albright | 119/14.47 |
| 4,434,744 A | | 3/1984 | Millar | |
| 4,483,272 A | | 11/1984 | Tonelli | |
| 4,807,566 A | * | 2/1989 | Chowdhury | 119/14.55 |
| 4,924,809 A | | 5/1990 | Verbrugge | |
| 2007/0245965 A1 | * | 10/2007 | Petterson et al. | 119/14.47 |
| 2007/0272160 A1 | | 11/2007 | Berentzen et al. | |

FOREIGN PATENT DOCUMENTS

| | | |
|---|---|---|
| CH | 667 973 A5 | 11/1988 |
| DE | 10 2005 017 094 A1 | 10/2006 |
| GB | 1 295 917 | 11/1972 |
| GB | 2 057 845 | 4/1981 |
| WO | WO 98/04118 | 2/1998 |
| WO | WO 03/003817 A2 | 1/2003 |

OTHER PUBLICATIONS

English language Abstract, Translated Description and Claims of WO 03/003817 A2, European Patent Office's esp@cenet.com database, 9pp.
English language Abstract, Translated Description and Claims of CH 667 973 A5, European Patent Office's esp@cenet.com database, 5pp.

(Continued)

*Primary Examiner* — Rob Swiatek
*Assistant Examiner* — Lisa Tsang
(74) *Attorney, Agent, or Firm* — Smith Law Office

(57) ABSTRACT

The invention relates to a milk collecting piece comprising a housing upper part with at least two intake nozzles and a housing lower part with at least two chambers which are each flow-connected to an outtake nozzle via an outlet.

24 Claims, 6 Drawing Sheets

OTHER PUBLICATIONS

English language Abstract, Translated Description and Claims of DE 10 2005 017 094 A1, European Patent Office's esp@cenet.com database, 6pp.

Form PCT/ISA/220, Notification of Transmittal of the Int'l Search Report and The Written Opinion of the Int'l Searching Authority, or the Decl., 3pp.

Form PCT/ISA/210, International Search Report received May 18, 2009, 5pp.

Form PCT/ISA/237, Written Opinion of the International Searching Authority received May 18, 2009, 7pp.

\* cited by examiner

MILK COLLECTING PIECES WITH CLOSABLE CHAMBERS

FIELD AND BACKGROUND OF THE INVENTION

The subject-matter of the invention relates to a milk collecting piece comprising a housing upper part with at least two intake nozzles and a housing lower part with at least two chambers which are each flow-connected to an outtake nozzle via an outlet.

Milking implements are used for the milking of animals, in particular of cows. A milking implement comprises a milk collecting piece which is connected to a teat cup via a respective short milking hose. The teat cup comprises a sleeve in which a teat rubber is arranged. The teat rubber is connected to the short milking hose. It is known that the teat rubber and the short milking hose are used in one piece as what is known as a monoblock. The short milking hose is connected to an intake nozzle. The milk flowing into the milk collecting piece through the milking hoses is conveyed away from the milk collecting piece via an outtake nozzle. The milk collecting piece is connected to a milk conveying line. A long milking hose is used for connecting.

For the milking of sheep and goats, milk collecting pieces are known having two intake nozzles. For the milking of cows, milk collecting pieces are known having four intake nozzles. The number of intake nozzles corresponds to the number of teats of the milk-providing animal.

Document U.S. Pat. No. 4,434,744 discloses a milk collecting piece having a housing. The housing is formed by a housing upper part and a housing lower part. At least two intake nozzles are provided. At least two chambers, which are each flow-connected to an outtake nozzle via an outlet, are provided within the housing.

Document DE 10 2005 017 094 A1 discloses a further embodiment of a milk collecting piece. This document describes a milk collecting piece with a housing in which four chambers are provided. The chambers are connected to intake nozzles. The milk entering the chambers issues from the milk collecting piece via an outtake nozzle.

During a milking process, the situation can occur that a milking cup falls away from the teat or is detached by the animal to be milked. If the milking cup falls away from the teat, then air flows through the milking cup and the short milking hose into the milk collecting piece. With the air, dirt can enter the milk collecting piece and ultimately the milk collecting container. In order to close off the air flow, it is known that the intake nozzles are configured in such a way that the milking hose kinks at the free end of the intake nozzle, so that the supply of air is interrupted. However, the valve function of the outtake nozzle/milking hose pairing is not satisfactory. This problem has already become known. U.S. Pat. No. 4,483,272 or CH-A5-667 973 provides in the milking cup a valve which can be used to prevent milk from issuing from the milking cup. The valve is formed by a valve body which enters into abutment against the valve seat as a result of reduced pressure or under the action of gravitational force.

SUMMARY OF THE INVENTION

The present invention is based on the objective of developing the known milk collecting piece in such a way that the operation of the milk collecting piece is improved still further.

The milk collecting piece according to the invention has a housing. The housing is formed by a housing upper part and a housing lower part. The milk collecting piece has at least two intake nozzles. Each intake nozzle opens into a respective chamber which is formed in the housing. Each chamber is flow-connected to an outtake nozzle via an outlet. The milk collecting piece according to the invention is distinguished in that at least one chamber has a bottom in which a trough is formed. A closing body is provided and is located, in a first position in the trough, below the outlet and, in a second position, before the outlet of the chamber.

Once the closing body has assumed the first position, then the outlet from the chamber is cleared, so that the milk flowing into the chamber through the intake nozzle can enter the outtake nozzle via the outlet. In the second position which the closing body can assume, said closing body is located before the outlet, in such a way that said outlet is substantially sealed off, so that the flow connection between the chamber and the outtake nozzle is substantially interrupted.

During a milking process, the milking cups are attached to the teats. The teat rubbers of the milking cups cover the teat as completely as possible. During the milking, milk or a milk/air mixture flows into the milk collecting piece. The milk or the milk/air mixture leaves the chamber through the outlet and enters the outtake nozzle. The closing body is located in the trough. In this case, milk or the milk/air mixture flows over the closing body.

If the milking cup falls away from the teat, then air at atmospheric ambient pressure flows suddenly and at high speed into the teat rubber and from there via the short milking hose into the associated chamber. The airflow causes a suction effect on the closing body which is located in the trough. Said closing body is removed from the trough by suction and passes into its second position at a sealing edge of the outlet of the chamber. The pressure differential between the reduced pressure in the outtake nozzle and the atmospheric ambient pressure in the teat rubber and thus also in the chamber generates a compressive force which is sufficiently great to hold the sealing body before the outlet of the chamber.

A significant advantage of the milk collecting piece according to the invention may also be seen in the fact that a closing function is preserved even in the event of disadvantageous situations or positions of the milk collecting piece; this is not the case in the collecting pieces according to the prior art.

The closing body is preferably embodied in such a way as to be substantially spherical. This has inter alia the advantage that the closing body does not have to be oriented in a predefined manner.

According to an advantageous configuration of the milk collecting piece according to the invention, it is proposed that the closing body have a surface consisting of at least one food-compatible material. Particularly preferable is in this case a configuration in which the closing body is made of high-grade steel, preferably stainless high-grade steel.

According to a still further advantageous configuration of the milk collecting piece according to the invention, it is proposed that the closing body have a mass between 5 g and 10 g, preferably 7 g. It has been found that a closing body having such a mass on the one hand does not float in the milk and on the other hand is sufficiently light to be drawn up to the outlet by suction.

The trough has a cross section adapted to the cross section of the closing body. A gap is preferably provided between the closing body and the casing of the trough. In operation of the milk collecting piece, milk flows into the gap during the milking process, so that a liquid film is formed between the closing body and the trough surface. The surface tension of this liquid film has an adhesive effect on the closing body. The resulting adhesion force counteracts a suction force, acting on the closing body as a result of the flow, on the surface part of the closing body, which is positioned in the flow, thus allowing a relatively high milk flow without the closing body being removed from the trough by suction during the milk flow and drawn before the outlet.

Particularly preferable is in this case a configuration in which the gap has a width between 0.1 mm and 1 mm, in particular 0.25 mm.

It is particularly advantageous if the gap is embodied in a substantially annular manner.

In a preferred configuration of the milk collecting piece, the trough has a portion which, viewed in the longitudinal direction of the trough, is substantially circular in cross section. The cross section is preferably constant. If the cross section is substantially constant, then the portion is substantially cylindrical.

In order to attain a gap having a substantially constant width, an advantageous configuration of the milk collecting piece proposes that a means be provided by which a centering of the closing body in the trough is brought about. The at least one means can have structures which are formed on the casing. It is particularly advantageous if the structures are at least three webs. If webs are provided, then the webs are preferably, viewed in the circumferential direction of the trough, arranged equidistantly to one another.

The webs or the means are embodied in such a way that the closing body can move in the longitudinal direction of the trough.

If the milking cup falls away from the teat, then air at atmospheric ambient pressure flows into the chamber. Said air flows through the chamber and leaves said chamber through the outlet. The air entrains the milk located between the closing body and the trough. This reduces the adhesion effect of the milk film, so that the closing body is drawn up to the outlet of the chamber by suction. In order to reduce the amount of air flowing through the milk collecting piece and thus to decrease the time necessary for closing, a further advantageous configuration of the milk collecting piece according to the invention proposes that at least one channel be provided and connect the trough to the chamber. As a result of the channel, the conveyance of milk out of the trough is increased. This decreases the closing time, as a result of which the amount of air flowing through the milk collecting piece can also advantageously be reduced According to a still further advantageous configuration of the milk collecting piece, it is proposed that the trough have at least one wall which is elastically deformable. In this case, the elastically deformable trough causes the sealing body to be secured under the pressure differential. If the pressure differential is reduced, the trough is to a certain extent demoulded, as a result of which the closing body is released. The closing body can pass to the outlet.

In order to attach a milking cup to a teat, it is necessary for a reduced pressure to prevail in the milking cup. This reduced pressure is also applied in the milk collecting piece. For this purpose, the outlet, against which the closing body rests, has a gap, thus allowing a certain amount of air to be removed by suction from the chamber of the milk collecting piece, the milking hose and the teat rubber. This airflow must on the one hand be as low as possible, but as high as is necessary to allow attachment of the milking cup within an acceptable time. In order to ensure stability of the applied vacuum and good milk quality, the milk flow must be as small as possible. However, rapid and convenient attachment of a milking cup is on the other hand attained when the reduced pressure in the milking cup can be generated quickly. This is attainable at a high airflow, because the milking cup can be released only once the closing body is located no longer before the outlet and a sufficiently high adhesive vacuum has been built up. The gap is preferably selected in such a way that the closing body falls away from the outlet within less than 5 sec. Preferably, the dimensions of the gap are such that the closing body falls from the outlet within less than 1 sec.

The attaching process or the build-up of the vacuum in the milking cup or in the chamber can be accelerated still further as a result of the fact that at least one resilient element, which, in the second position of the closing body, exerts on said body a force directed substantially away from the outlet, is provided adjacent to the outlet.

Further details and advantages of the milk collecting piece according to the invention will be described with reference to the exemplary embodiments illustrated in the drawings, without the subject-matter of the invention being restricted to these specific exemplary embodiments.

DETAILED DESCRIPTION OF THE PREFERRED EMBODIMENTS

Figure 1:
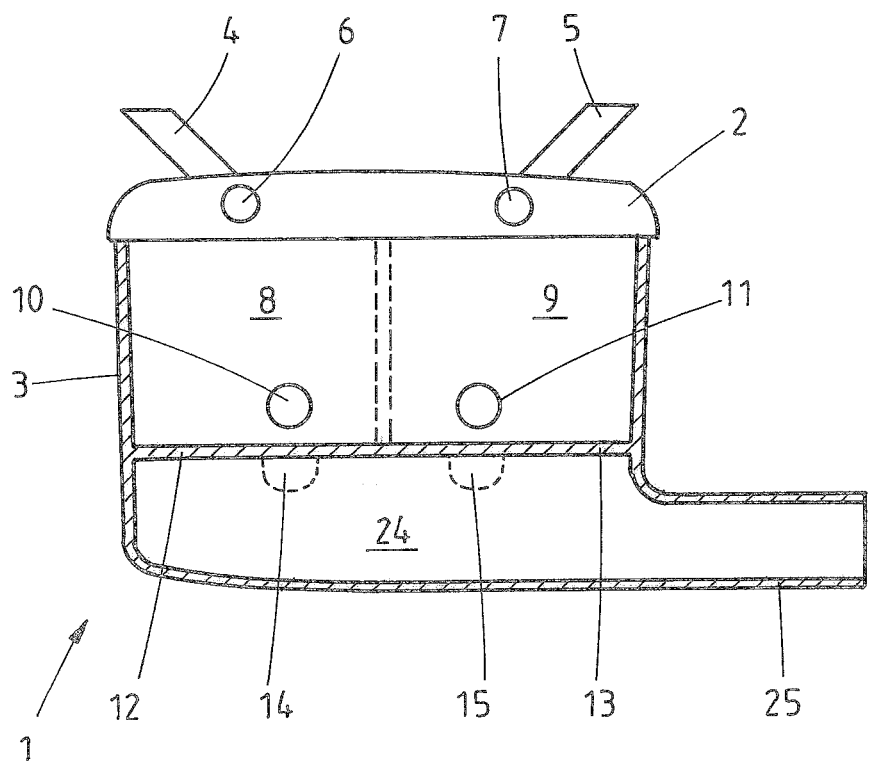
FIG. 1 is a schematic section of a milk collecting piece.
Figure 2:
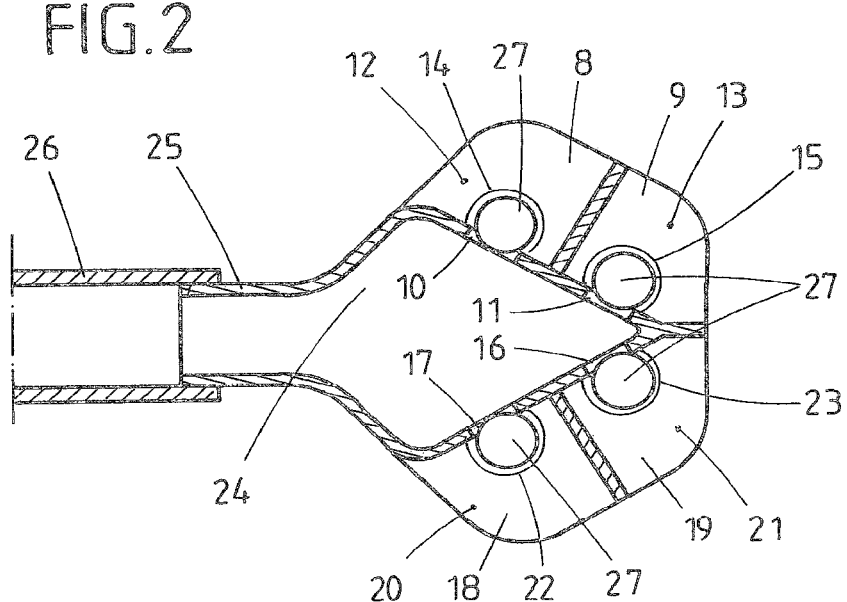
FIG. 2 is a plan view of the milk collecting piece according to FIG. 1.

FIGS. 1 and 2 are schematic views of an exemplary embodiment of a milk collecting piece according to the invention. The milk collecting piece has a housing 1. The housing 1 is embodied in two parts. It has a housing upper part 2 and a housing lower part 3. The housing upper part 2 and the housing lower part 3 are joined together via connecting means (not shown). Both the housing upper part 2 and the housing lower part 3 have sealing surfaces, thus allowing the housing parts 2, 3 to be joined together in an airtight manner.

In the illustrated exemplary embodiment, the housing upper part 2 is connected to intake nozzles 4, 5. The intake nozzles 4, 5 have mouths into which corresponding chambers of the milk collecting piece open. For the milking of a cow, the milk collecting piece has four intake nozzles. A milking hose (not shown) is connected to each of the intake nozzles.

It is not compulsory for the intake nozzles to be formed on the housing upper part 2. It is also possible for the intake nozzles to be able to be formed on the housing lower part. The term "an intake nozzle" can also refer to an intake opening. If an intake opening is provided, an end region of a milking hose can be introduced therein. The end region can have an annular groove into which an edge region of the intake opening protrudes.

In the illustrated exemplary embodiment, the housing lower part has four chambers 8, 9, 18 and 19, as may be seen from the view according to FIG. 2. The chambers 8, 9, 18 and 19 are each connected to a milking cup via an intake nozzle which is connected to a milking hose, so that the milk output of one udder quarter enters one chamber.

Each chamber 8, 9, 18 and 19 has a respective bottom 12, 13, 20 and 21. A trough 14 is formed in the bottom 12 of the chamber 8. Corresponding troughs 15, 22 and 23 are provided in the chambers 9, 18 and 19.

Adjacent to the troughs, each chamber has an outlet 10, 11, 16 and 17, so that the milked milk can flow out of the chambers into a collecting chamber 24 through the outlets. The milk leaves the collecting chamber 24 through an outtake nozzle 25 which is connected to a long milking hose 26.

A respective closing body 27 is located in each trough. The closing body assumes in the trough a first position. In a second position, the closing body is located before the outlet of the chamber in question.

Figure 3:
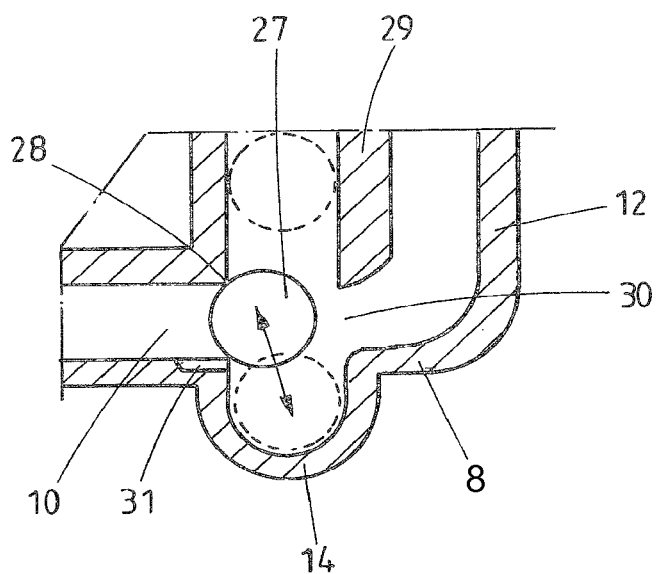
FIG. 3 is an enlarged view of a chamber of the milk collecting piece with a closing body.

FIG. 3 is a section and a side view of a chamber 8. Two positions of the closing body 27 are illustrated in broken lines. The closing body 27 is located in one position in the trough and in the other above the trough. The closing body can assume this upper position if, for example, the milk collecting piece is rotated. The closing body 27 is embodied in a substantially spherical manner. Particularly preferred is in this case a closing body, the surface of which consists at least partly of a food-compatible material. Particularly preferred is the embodiment of a closing body in the form of a steel ball having a weight of approx. 7 g. The trough 14 is adapted to the contour of the closing body 27. The ratio of the depth of the trough to the diameter of the closing body is between 0.4 and 0.9, preferably 0.7. In the case of the preferred configuration, the overhang of the closing body out of the trough is approx. 30% of the ball diameter.

The outlet 10 has a substantially circular cross section. The diameter of the outlet is smaller than the diameter of the spherical closing body 27. The outlet 10 has a sealing surface 28. In the closed position, the closing body 27 (solid line in FIG. 3) rests against the sealing surface 28 of the outlet 10, so that the outlet 10 is closed. FIG. 3 shows a modified chamber 8. A wall 29, which restricts the movement of the closing body 27, is provided in the chamber 8. The wall 29 has preferably a wedge-shaped/circular cross section. The wall 29 extends in the direction of the bottom 12 and ends before said bottom so as to form a gap 30. The gap 30 has preferably a height which is somewhat less than the diameter of the closing body 27, so that the closing body is movable substantially within the space delimited by the wall 29 and also the side wall of the chamber. This has the advantage that the closing body can enter the trough 14 at all times.

Two positions of the closing body 27 are illustrated in broken lines. In the first position, the closing body is located in the trough 14. In a third position (illustrated in broken lines), the closing body passes upward beyond the outlet 10, the movement of the closing body being delimited by the wall 29.

The sealing surface 28 has preferably at least one conduit 31. Targeted leakage between the chamber 8 and the collecting chamber 24 is generated through the conduit 31. In the event of reduced pressure in the collecting chamber and in the illustrated position of the closing body 27 before the outlet 10, an airflow of low definition flows permanently without substantially reducing the pressure in the collecting chamber 24.

If a milking cup is applied to the teat of an animal and if the teat rubber surrounds the teat in a substantially airtight manner, then the chamber 8 is closed off from external pressure. As a result of the leakage of the sealing surface 28, the force acting on the closing body 27 is reduced. In the event of undercutting of a defined pressure differential which is dependent on the weight of the closing body, the closing body falls away from the sealing surface 28 and enters the trough 14. The outlet 10 is thus cleared.

Figure 4:
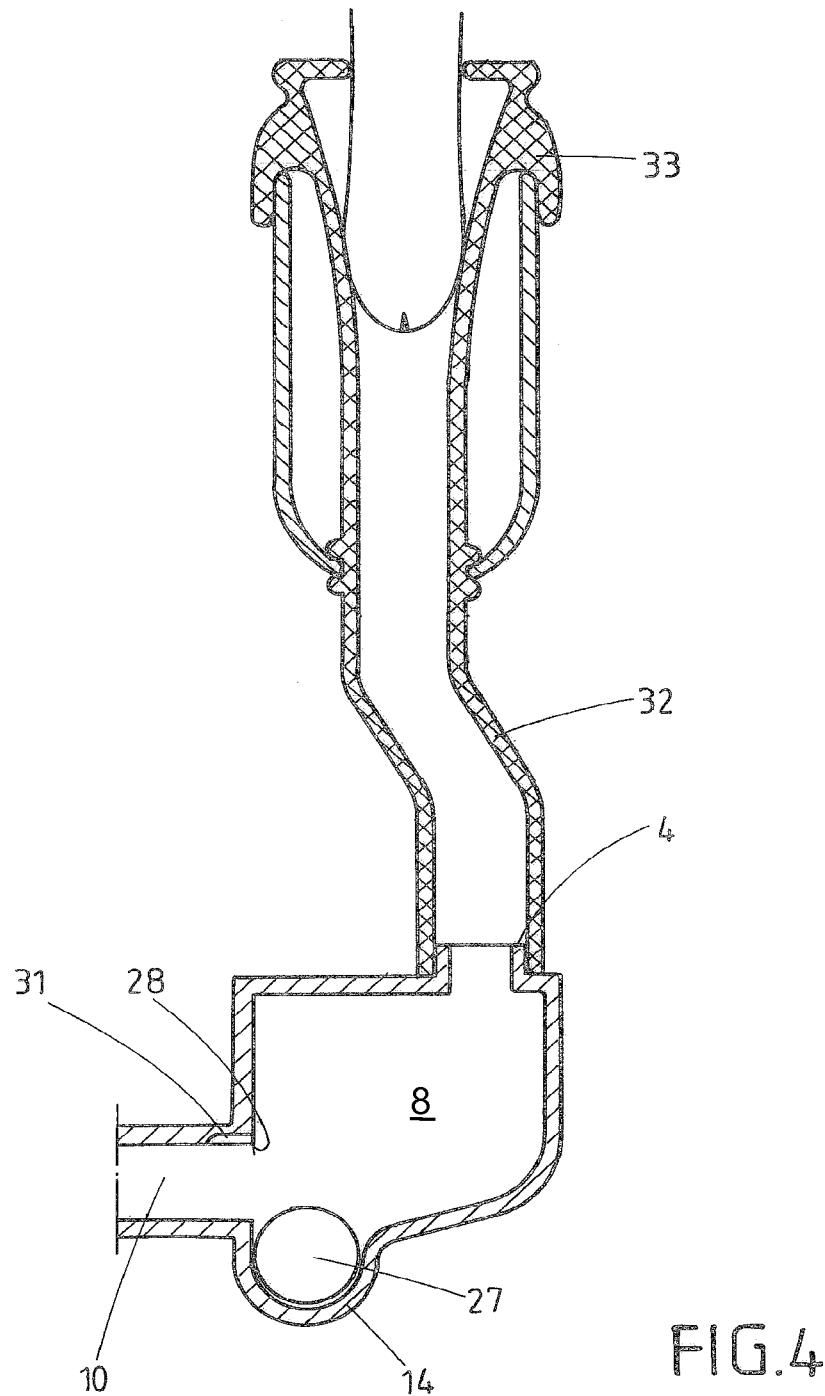
FIG. 4 is a schematic section of the milk collecting piece with the milking hose and milking cup in a first position of the closing body.

FIG. 4 is a schematic section of the chamber 12 of the milk collecting piece connected to a short milking hose 32 and a milking cup 33. The milking hose 32 is connected to the chamber 12 via an intake nozzle 4. The view according to FIG. 4 shows the closing body 27 in a first position in which the closing body 27 is located in the trough 14.

During a milking process, a teat is located within the milking cup. The teat is preferably arranged in the teat rubber in such a way that between the teat and teat rubber no air or only a small air inlet is possible. The closing body 27 is located in the trough 14, so that the outlet 10 is cleared. The view of FIG. 4 reveals that the bulk of the closing body 27 is located in the trough 14. During a milking process, milk or a milk/air mixture flows directly over merely a small part of the surface of the closing body 27.

Figure 5:
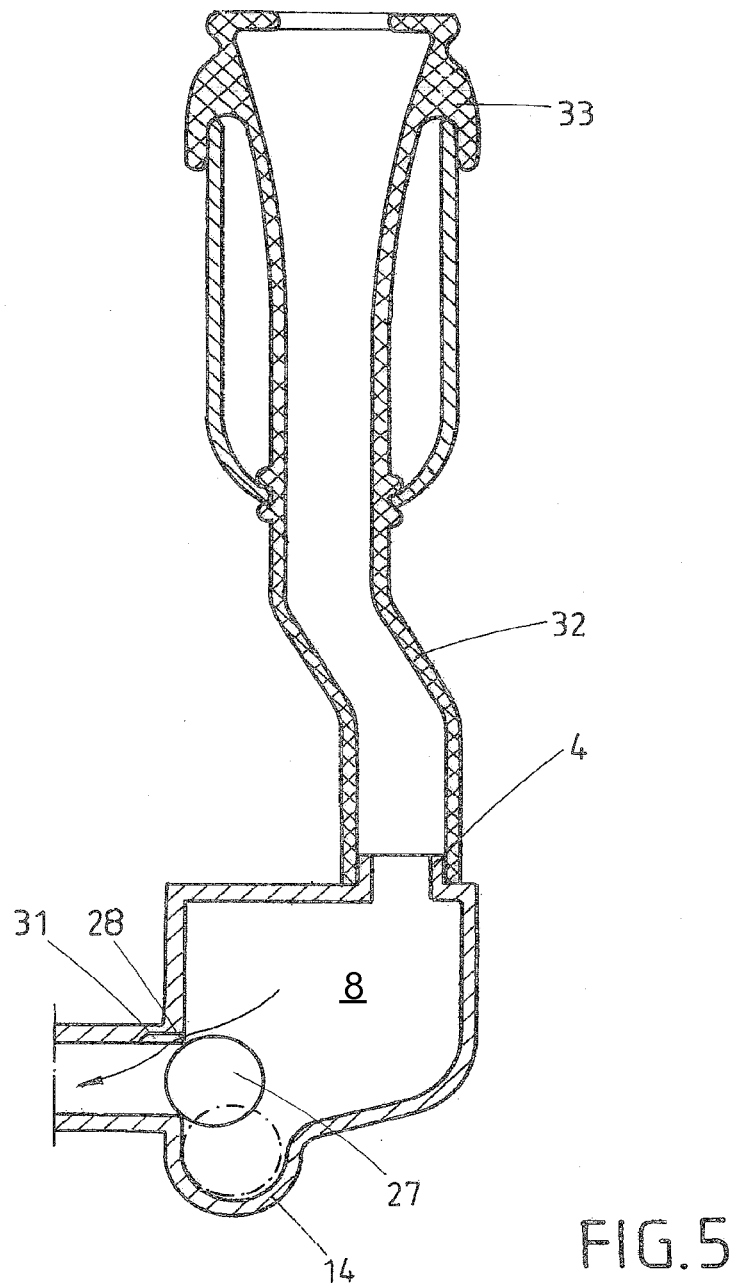
FIG. 5 is a schematic view of the milk collecting piece according to the invention with the milking hose and milking cup in a second position of the closing body.

If the milking cup 33 is removed from the teat, air flows into the chamber 12, causing the closing body 27 to pass from its first position in the trough 14 into a second position before the inlet 10 up to the sealing surface 28. This position of the closing body 27 is illustrated in FIG. 5. An arrow illustrates the leakage of the air flowing through the conduit 31 in the sealing surface 28.

Figure 6:
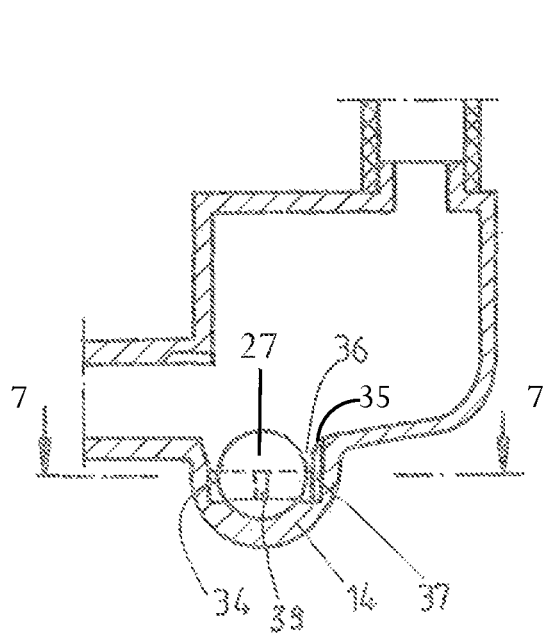
FIG. 6 is a cross section of a further exemplary embodiment of a configuration of a trough.
Figure 7:
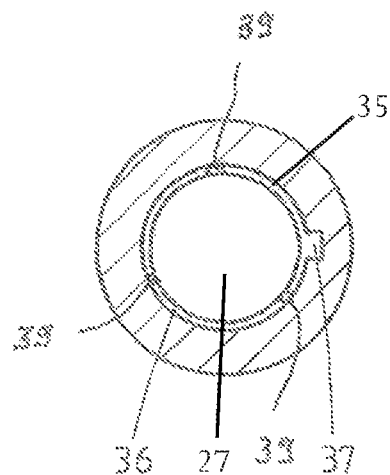
FIG. 7 is an enlarged view along the sectional line 7-7 according to FIG. 6.

FIGS. 6 and 7 illustrate a still further exemplary embodiment of a milk collecting piece according to the invention. The embodiment illustrated in FIG. 6 corresponds substantially to the configuration of the chamber 8. FIG. 6 and FIG. 7 show a trough 14 having a substantially cylindrical portion. A gap 36 is formed between the closing body 27 and the casing 35 of the cylindrical portion 34.

The views in FIGS. 6 and 7 reveal that a means 39 is provided. The means 39 is in the form of webs extending in the longitudinal direction of the trough. The view according to FIG. 6 shows that the webs are formed in the substantially cylindrical portion 34. The view in FIG. 7 shows the provision of three webs arranged substantially equidistantly to one another. Instead of webs, the means 39 can be formed also by structures, for example knob-shaped projections. The means centre the closing body 27 in the trough 14. As a result, the gap 36 is kept substantially constant. The means 39 are directed radially inward, the means having a radially inwardly directed extension such as to allow movement of the closing body in the longitudinal direction of the trough.

During the milking process, milk enters the gap 36. The surface tension of the milk film in the gap 36 has an adhesive effect relative to a suction force on the surface part of the closing body 27, which is positioned in the milk flow, and thus allows a higher milk flow, without the closing body 27 being pressed during a milking process against the sealing surface 28 of the outlet 1.

The views in FIGS. 6 and 7 also show that a channel 37 is provided in the casing 35.

If, instead of milk, air flows into the chamber 8, then the airflow entrains the milk located in the trough 14. As a result of the channel 37, the conveyance of the milk out of the trough 14 is sped up, so that the reaction time, i.e. the closing time of the outlet 10, is also reduced.

Figure 8:
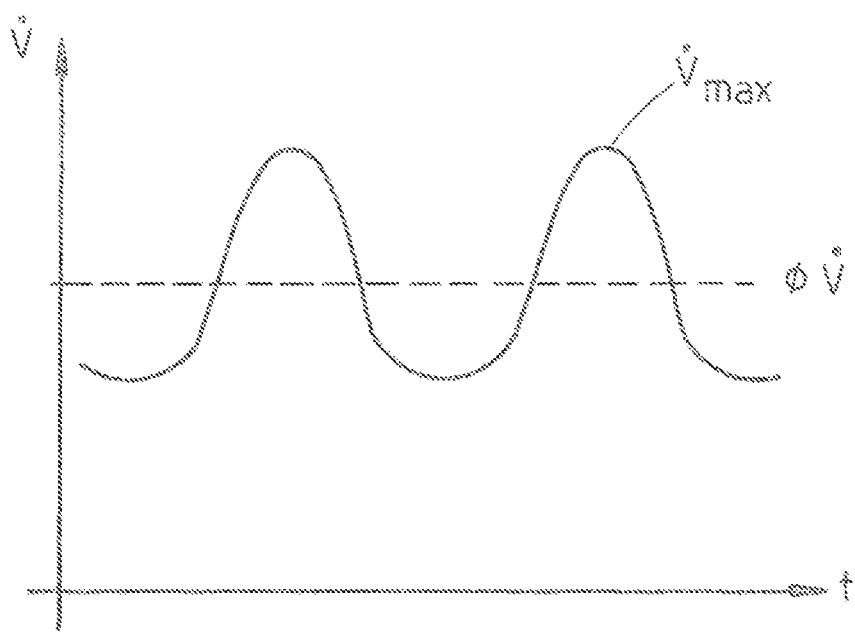
FIG. 8 shows the temporal change in the volume flow over time.

The gap 36 between the closing body 27 and the casing 35 of the trough 14 allows damping of speed peaks. If a fluid flows over the closing body 27, then a certain suction force acts on said body. The suction force increases in tandem with the flow speed of the fluid. The suction force counteracts the weight of the closing body 27. If the suction force acts on the closing body 27, then a reduced pressure, which draws the closing body downward, is formed below the closing body. This reduced pressure is also broken down in that fluid is added to the gap. Once the gap is completely covered by milk, only milk can continue to run. This allows the speed peaks to be broken down without the closing body being drawn completely out of the trough by suction, so that speed peaks of the milk have substantially no influence on the closing behaviour of the closing body. The exemplary course of the volume flows is illustrated in FIG. 8.

Figure 9:
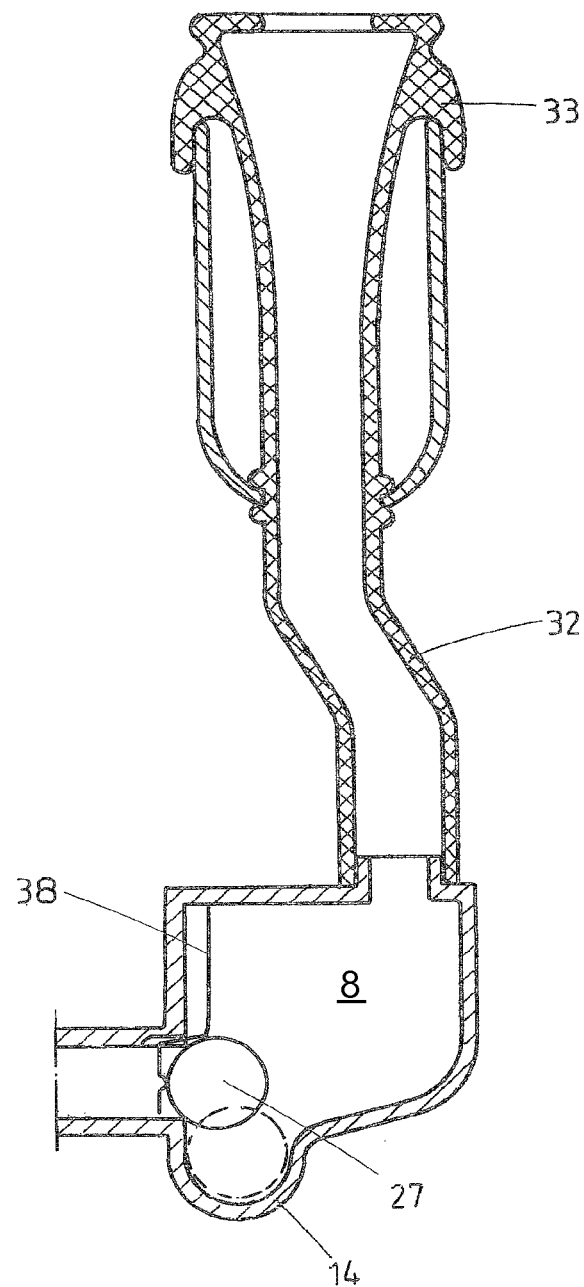
FIG. 9 is a section of a further exemplary embodiment of a milk collecting piece connected to a milking hose and milking cup.

For attaching the milking cup to the teat of an animal, the milking cup is, insofar as it is not attached automatically by means of a milking robot, attached to the animal by hand. During the attaching process, the closing body 27 is located before the outlet 10 or on the sealing surface 28. The amount of air flowing through the conduit 31 is relatively low compared to the amount of air which would have to be removed by suction from the chamber 8, the milking hose 32 and the teat cup 33 in order to break down a certain pressure differential between the chamber 8 and the collecting chamber 24, so that the closing body 27 enters the trough 14. A resilient element 38, against which the closing body 27 rests, as it may also be seen from FIG. 9, is provided to speed this up. The resilient element 38 exerts a force on the closing body 27 which is directed in opposition to the outlet 10. As a result, the closing body 27 enters the trough 14 at an earlier point in time.

The invention claimed is:

1. A milk collecting piece comprising:
    a milk collecting housing defining a plurality of chambers and at least one chamber has a bottom defining a trough;
    an intake nozzle, in fluid communication with at least one chamber;
    an outtake nozzle in fluid communication with at least one chamber; and
    a closing body movable between a first position that is substantially entirely in the trough and at least partially below an outlet and an upper position that is at least partially above the trough.

2. The milk collecting piece according to claim 1, wherein the closing body is substantially spherical.

3. The milk collecting piece according to claim 1, wherein the closing body has a surface comprising at least one food-compatible material.

4. The milk collecting piece according to claim 1, wherein the closing body has a mass of between about 5 grams and about 10 grams.

5. The milk collecting piece according to claim 1, wherein the trough has a cross section shaped to substantially mate with at least a portion of a cross section of the closing body.

6. The milk collecting piece according to claim 1, wherein the closing body and the trough define a gap therebetween when the closing body is in the first position.

7. The milk collecting piece according to claim 6, wherein the gap has a width of between about 0.1 millimeters and about 1 millimeters.

8. The milk collecting piece according to claim 1, wherein the trough has a substantially flat bottom.

9. The milk collecting piece according to claim 1, wherein the trough has at least a portion that is substantially arcuate cross section.

10. The milk collecting piece according to claim 1, and further comprising:
    a centering device that centers the closing body in the trough.

11. The milk collecting piece according to claim 10, wherein the centering device comprises:
    a structure disposed at least partially in the trough.

12. The milk collecting piece according to claim 11, wherein the structure comprises at least three webs.

13. The milk collecting piece according to claim 12, wherein the webs are spaced apart equidistant from one another.

14. The milk collecting piece according to claim 1, and further comprising:
    at least one channel, and the trough communicates with one of the chambers via the at least one channel.

15. The milk collecting piece according to claim 1, wherein the trough includes at least one elastically deformable wall.

16. The milk collecting piece according to claim 1, and further comprising:
    at least one resilient element biasing the closing body away from the outlet.

17. The milk collecting piece according to claim 1, wherein the closing body has a mass of about 7 grams.

18. The milk collecting piece according to claim 6, wherein the gap has a width of about 0.25 millimeters.

19. The milk collecting piece according to claim 1, wherein the trough has a substantially constant cross section.

20. The milk collecting piece of claim 1, wherein the closing body in the upper position is in contact with a sealing surface of the outlet to substantially close the outlet.

21. The milk collecting piece of claim 1, wherein the closing body in the upper position is at least partially above the outlet.

22. The milk collecting piece according to claim 1, wherein the closing body and the trough define a gap therebetween when the closing body is in the first position.

23. The milk collecting piece according to claim 22, wherein the gap has a width of between about 0.1 millimeters and about 1 millimeter.

24. The milk collecting piece of claim 1, wherein the trough has a substantially circular cross-section.

* * * * *